Feb. 13, 1923.

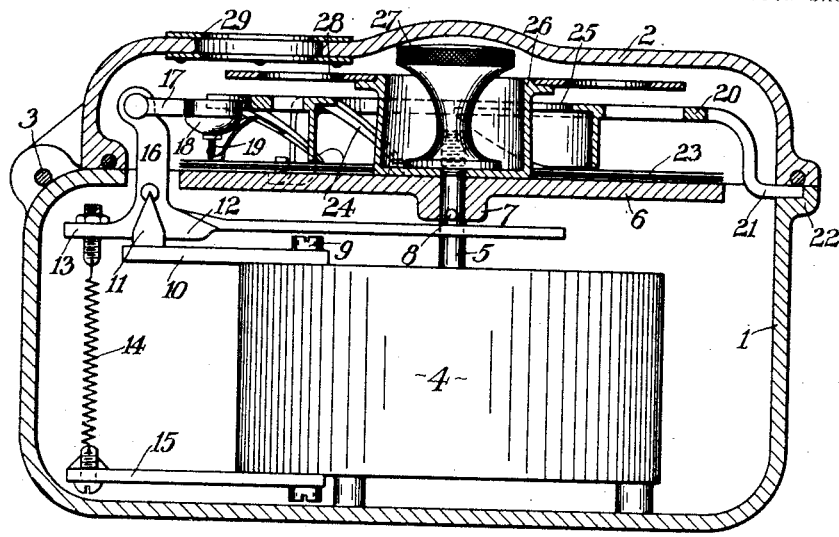
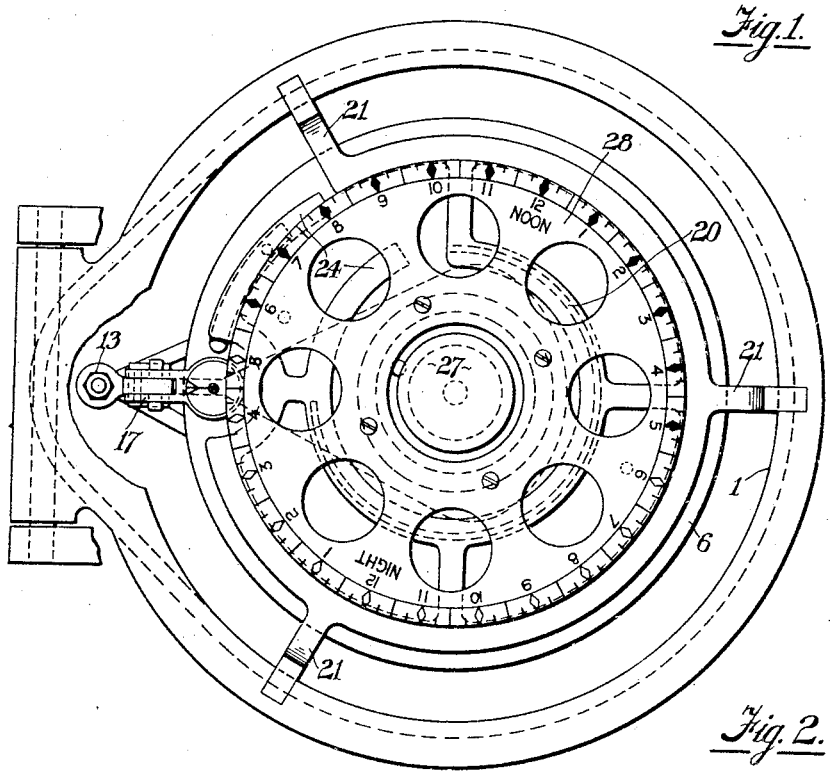

H. HOLLINGDRAKE ET AL

IN MOTION RECORDER FOR VEHICLES

Filed Sept. 1, 1921

Patented Feb. 13, 1923.

1,445,214

UNITED STATES PATENT OFFICE.

HENRY HOLLINGDRAKE AND THOMAS LEE, OF STOCKPORT, ENGLAND.

IN-MOTION RECORDER FOR VEHICLES.

Application filed September 1, 1921. Serial No. 497,600.

*To all whom it may concern:*

Be it known that we, HENRY HOLLINGDRAKE and THOMAS LEE, both subjects of the King of Great Britain and Ireland, residing at 65 Princes Street, Stockport, Chester, England, have invented new and useful Improvements in or Relating to In-Motion Recorders for Vehicles, of which the following is a specification.

The invention relates to improvements in or relating to in-motion recorders for vehicles and has for its object to provide means whereby a recorder may be caused to give a record extending over a period of more than 24 hours.

It is also an object of the invention to reduce the cost of production and to produce a recorder of a more compact character than heretofore.

According to the invention the recorder comprises a table rotated by a train of clock work upon which a chart of helical form is mounted. The motion of the vehicle upon which the recorder is mounted causes vibration of an arm or lever which actuates a style to indicate upon the chart the periods during which the vehicle has been in motion and at rest. Each convolution of the helical chart preferably receives the record covering a period of 24 hours and if an eight day clock movement is employed a continuous record for such period can be obtained.

Reference will now be made to the accompanying drawings which illustrate one form of the invention and in which:—

Figure 1 shows in sectional elevation an instrument constructed according to the invention;

Figure 2 is a plan of Figure 1 with the lid of the case broken away.

Figure 3:
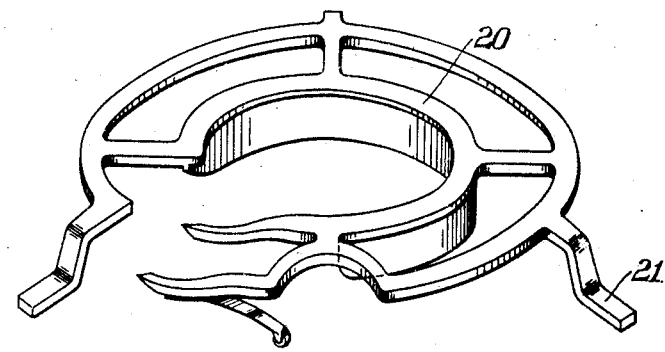
Figure 3 is a perspective view of the non-rotating table or platform.
Figure 4:
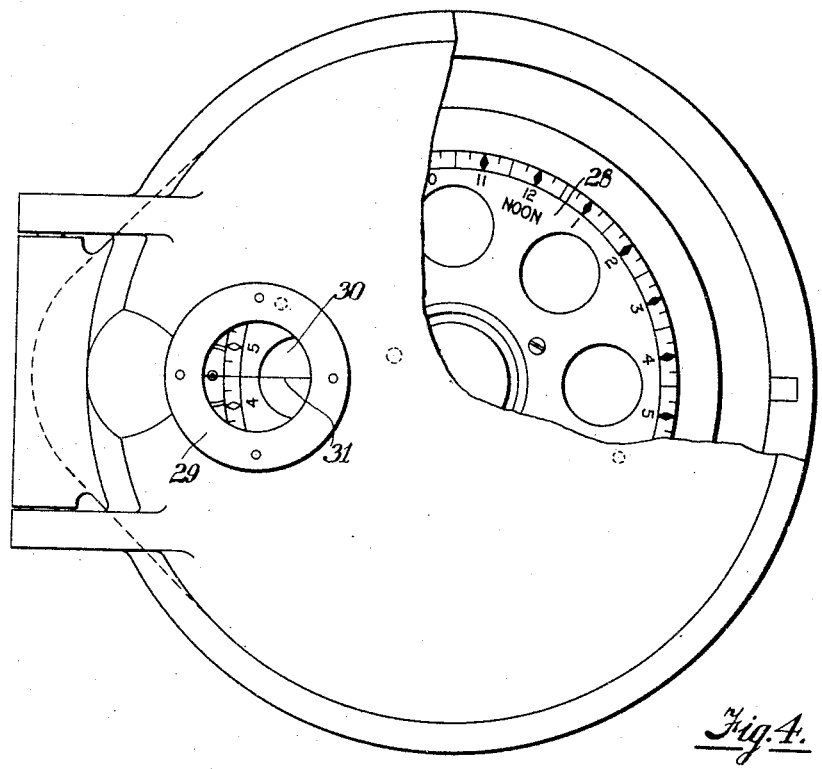
Figure 4 shows in plan the case containing the sight hole.

In the drawings 1 represents the case of an instrument which by way of example is circular in shape, may be formed by casting or otherwise, and is provided with a lid 2 hinged as at 3 which latter can be secured by any suitable means.

Secured within the case 1 by means of screws or the like is a clock movement 4 preferably though not essentially of the 8 day type, through one pivot plate of which projects a spindle 5 adapted to be rotated thereby, and upon which is mounted the rotatable table 6, a slotted collar or boss 7 formed thereon engaging a pin 8 fast in the spindle 5.

Fixed to one of the pivot plates of the clock movement by screws or the like 9 is an arm or bracket 10 which carries at its outer end a vertical standard 11 upon which is unequally mounted a vibrating arm or lever 12, the longer arm of which extends into the space between the rotatable table 6 and the clock movement 4, the shorter arm 13 of said lever 12 being connected by means of a spring 14 to a bracket 15 secured to the lower pivot plate of the clock movement 4 as shown.

Upon said vibrating arm or lever 12 is a vertical arm or offset 16 upon which is pivotally mounted a short arm 17 which is provided with a weight 18 in which a style or the like 19 is mounted.

Arranged above the rotating table 6 is a spider shaped perforated table 20 of skeleton formation as shewn in Figures 2 and 3 provided with lugs 21 which register in suitable grooves recessed in the rim 22 of the casing 1, being clamped and held rigid by the lid 2 when the box or casing is closed, as in Figure 1.

A helical chart 23 is provided wherein each convolution is marked off to represent 24 hours, or any suitable period of time and is mounted on the rotating table 6 so that as the table 6 rotates the chart moves over the inclined portion 24 of the spider 20 on to the surface 25, in order to produce a continuous record over a succession of days when the vehicle is in use.

The chart 23 is rigidly maintained relative to the rotating table 6 and in driving connection therewith by perforations in the chart engaging pins or studs in the table, the last convolution of the chart having a solid centre and passing under a cup shaped member 26. This cup shaped member 26 fits over the clock spindle 5 and is clamped to the rotating table 6 by a milled nut 27. It is fitted with an annular ring 28, the upper surface of which is divided circumferentially to represent 24 hours, each hour being suitably sub-divided. The lid 2 is provided with a sight hole as at 29, closed by means of glass, mica or other transparent substance 30, which is furnished with a sight line 31, preferably coloured red, and through this sight hole the annular ring 28 may be viewed by the driver of the vehicle the time being indicated by the coincidence of the sight line and the markings on the annular ring.

In operation the clock movement is wound up, the arm 17 is moved radially through about 90°, clear of the rotating table 6 and the helical chart placed on the latter, the studs in the table 6 engaging the perforations in the helical chart. The spider 20 is then placed over the chart and the milled nut 27 screwed home on the clock spindle 5. The arm 17 is then returned to its normal position; on rotating the annular ring 28 in a counter clockwise direction, the helical chart mounts the inclined portion 24 of the spider 20 and the style point is resting on the graduated surface of the helical chart in its operative position. The annular ring can be rotated until the chart is correctly set according to the time. The clock being in motion, the vibration of a vehicle on which the instrument is mounted causes the arm 12 to oscillate. The oscillations are transmitted to the style 19 which traces a zig-zag line circumferentially around the helical chart. When the vehicle is at rest the chart continues to be fed beneath the style which if it engages the chart during such period would produce a partially circular line in contradistinction to the zig-zag markings characteristic of motion. The periods of rest and of movement of the vehicle can thus be identified with ease from the chart. As the table 6 rotates the chart is fed gradually up the inclined portion 24 onto the upper surface 25 of the spider until at the conclusion of the period for which a single chart is intended to be used, the whole of such chart with the exception of its last convolution has been transferred to the upper surface of the spider.

It will be understood that the graduations on the helical chart may be varied to represent periods of time other than 24 hours, or the helical chart may be replaced by a circular disc of paper or the like, without in any way departing from the spirit of the invention.

We claim:—

1. A vibration recorder comprising a casing, a spindle mounted in said casing, means for continuously rotating said spindle, a table mounted on said spindle, a helical record chart supported by said table, a vibrating weight, a marking device contacting with said chart and carried by said weight and means for removing the marked portion of said chart to a plane above the marking device.

2. A vibration recorder comprising a casing, a spindle mounted in said casing, a prime mover for continuously rotating said spindle, a table mounted on said spindle, a helical record chart supported by said table and movable therewith, a vibrating weight pivoted beneath said table, a spiral spring connecting said weight to a fixed point, a marking device contacting with said chart and carried by said weight and means for removing the marked portion of said chart to a plane above the marking device.

3. A vibration recorder comprising a casing, a spindle mounted in said casing, a prime mover for continuously rotating said spindle, a table mounted on said spindle, a helical record chart supported by said table and movable therewith, a vibrating weight pivoted beneath said table, a spiral spring connecting said weight to a fixed point, a marking device contacting with said chart and carried by said weight, a spider fixed above said rotary table and means for feeding the marked portion of said chart onto the upper surface of said spider.

4. A vibration recorder comprising a casing, a spindle mounted in said casing, a prime mover for continuously rotating said spindle, a table mounted on said spindle, a helical record chart supported by said table and movable therewith, a vibrating weight pivoted beneath said table, a spiral spring connecting said weight to a fixed point, a marking device contacting with said chart and carried by said weight, a cup shaped member mounted on said table, a nut engaging the end of said spindle securing said member in place, a disc graduated in units of time mounted on said member, a spider fixed to the casing and disposed between said table and disc, an inclined portion in said spider and means for feeding the marked portion of said chart up said inclined portion onto the upper surface of said spider.

5. A vibration recorder comprising a casing, a helical record chart mounted within said casing, means for continuously rotating said record chart, a vibrating weight mounted below said record chart, a marking device contacting with said record chart and actuated by said weight, a fixed plate disposed above said chart and means for feeding the marked portion of said chart onto the upper surface of said plate.

6. A vibration recorder comprising a casing, a spindle mounted in said casing, a spring motor for rotating said spindle, a table rotatable with said spindle, a helical record chart supported on said table, a vibrating weight disposed below said record chart, a marking device carried by said weight and contacting with said chart, a spider fixed in said casing above the table, means for feeding the marked portion of the chart onto the upper surface of said spider and means actuated by said table for giving visual indications of time.

7. A vibration recorder comprising a casing, a spindle mounted in said casing, a prime mover for continuously rotating said spindle, a table mounted on said spindle, a helical record chart supported by said table and movable therewith, a vibrating weight pivoted beneath said table, a spiral spring connecting said weight to a fixed point, a marking device contacting with said chart and carried by said weight, a cup shaped member mounted on said table, a nut engaging the end of said spindle securing said member in place, a disc graduated in units of time mounted on said member, a window in said casing for observing the position of said disc, a spider fixed to the casing and disposed between said table and disc, an inclined portion in said spider and means for feeding the marked portion of said chart up said inclined portion onto the upper surface of said spider.

8. A vibration recorder comprising a casing, a spindle mounted on said casing, a prime mover for continuously rotating said spindle, a table rotatable with said spindle, a helical record chart movable with said table, a weighted lever disposed beneath said table, a pair of knife-edges forming a fulcrum for said lever, yielding means restraining vibration of said lever, a marking device pivotally connected to said lever and contacting with the surface of said chart and means for removing the marked portion of said chart continuously to a plane above said marking device.

In witness whereof we affix our signatures.
HENRY HOLLINGDRAKE.
THOMAS LEE.